United States Patent [19]
Barrack et al.

[11] Patent Number: 6,047,279
[45] Date of Patent: Apr. 4, 2000

[54] SYSTEM AND METHOD FOR AUTOMATIC NETWORK MANAGEMENT SUPPORT USING ARTIFICIAL INTELLIGENCE

[75] Inventors: Martin Barrack, Folsom; Andrew H. Lee, El Dorado Hills, both of Calif.

[73] Assignee: Objective Systems Integrators, Inc., Folsom, Calif.

[21] Appl. No.: 08/971,528

[22] Filed: Nov. 17, 1997

[51] Int. Cl.[7] ................................................... G06F 17/00
[52] U.S. Cl. .................................. 706/60; 706/61; 706/62
[58] Field of Search ............................... 706/60, 45, 908, 706/917, 61, 62; 702/186

[56] References Cited

U.S. PATENT DOCUMENTS

| | | | |
|---|---|---|---|
| 4,999,833 | 3/1991 | Lee .......................................... | 370/312 |
| 5,159,685 | 10/1992 | Kung ....................................... | 706/908 |
| 5,175,800 | 12/1992 | Galis et al. ............................... | 706/45 |
| 5,317,742 | 5/1994 | Bapat ...................................... | 709/300 |
| 5,608,720 | 3/1997 | Biegel et al. ............................ | 370/249 |
| 5,628,011 | 5/1997 | Ahamed et al. .......................... | 707/10 |
| 5,661,668 | 8/1997 | Yemini et al. ........................... | 702/186 |
| 5,715,371 | 2/1998 | Ahamed et al. .......................... | 706/10 |
| 5,764,955 | 6/1998 | Doolan .................................... | 709/223 |
| 5,774,689 | 6/1998 | Curtis et al. ............................. | 395/500 |
| 5,870,667 | 2/1999 | Globuschutz ........................... | 455/67.1 |
| 5,920,565 | 7/1999 | Cullen ..................................... | 370/401 |

OTHER PUBLICATIONS

Marketing Brochure: Copyright 1997 by Objective Systems Integrators—"NetExpert Framework Overview".

Marx, "CLUES Dyanmic persoanlized message filtering", CSCW ACM, pp 113–121, 1996.

Enfiled, "Development of the AT&T personaLink services online documenation system", DOC ACM, pp 39–48, Oct. 1995.

Kimbrough, "On automated message processing in elecetronic commerce and work support system: Speech act theory and expressive felicity", ACM Trans. on inf. Systm, vo. 15, No. 4, pp 321–367, Oct. 1997.

Cai, "AN object oriented model for intelligent network", ACM, pp 521–525, 1992.

Dress, "On modeling and controlling intelligent system", CIKM ACM, pp 223–232, Nov. 1993.

Cammarata et al., "Extending a relational database with deferred referential integrity checking and intelligent joins" ACM, pp pp 88–97, May 1989.

Gaiti et al., "Performance management issues in ATM networks: traffics & congestion control", IEEE Trans. on Networking, vol. 4, No. 2, pp 249–257, Apr. 1996.

Zibman et al., An architectural approach to minimizing feature interactions in telecommunications, IEEE Trans. on networking, vol. 4, No., 4, pp 582–596, Aug. 1996.

NetExpert Framework Overview, Objective Systems Integrators, pp 1–32, Jan. 1997.

*Primary Examiner*—Eric W. Stamber
*Assistant Examiner*—Anil Khatri
*Attorney, Agent, or Firm*—Fulbright & Jaworski L.L.P.

[57] ABSTRACT

The inventive system and method incorporates artificial intelligence concepts to create a system that automatically integrates new network elements. The system detects the connection of the new element with the system. The system identifies the new element, either directly or inferentially, by examining the protocol, the inputs, and the outputs of the new element, as compared with stored information. The inventive system then either selects the appropriate rule set from previously written rules, modifies an existing rule set from similar elements, or creates an appropriate rule set to integrate each new element into the network. The rule set produced by the system is then used to manage the new element.

60 Claims, 1 Drawing Sheet

SYSTEM AND METHOD FOR AUTOMATIC NETWORK MANAGEMENT SUPPORT USING ARTIFICIAL INTELLIGENCE

TECHNICAL FIELD OF THE INVENTION

This application relates in general to network management systems, and in specific to such a system that uses artificial intelligence to manage the rule sets for network element operation.

BACKGROUND OF THE INVENTION

The information-communication industry is currently undergoing tremendous change from the constant evolution of new technologies and changing market conditions. As a result, information service providers such as telephone, cable, and wireless carriers, Internet Service Providers and utility companies all have the need to rapidly deploy new systems and system elements and alter their existing management systems to accommodate evolving business and network requirements. These requirements include the ability to integrate existing network equipment and systems with new elements and applications, customize existing systems and applications, and scale systems to accommodate growing networks and traffic volumes.

Network management and operations become crucial to the competitiveness of communication companies, utilities, banks and other companies operating Wide Area Networks (WANs) of computer devices. Many companies currently use customized "legacy" network management systems (NMSs) and operations support systems (OSSs) that are based on older technologies, which poorly integrate disparate network elements. Still others use NMSs and OSSs that are not scaleable, cannot be easily interfaced with disparate network elements, and require costly programming while offering limited features and flexibility.

Objective Systems Integrators, Inc. (OSI) currently produces an NMS sold under the trademark NetExpert™. NetExpert is an object-oriented NMS/OSS that is comprised of a set of integrated software modules and graphical user interface (GUI) development tools that permit the creation and deployment of network management and operations support solutions. The NetExpert framework provides a platform for the creation of a NMS/OSS for nearly any complex WAN. Each element, device and even database may be managed as a separate "object." However, NetExpert, like other NMSs/OSSs on the market today, still requires specific customization for each managed object.

Each element, device and other managed object requires a separate set of rules to be tailored to the nature of the object, its specific hardware and software, and the business practices of the company. Each rule set provides the details for the management of the particular object to which the rules are directed. NetExpert's Fourth Generation Language (4GL) editors permit this customization to be performed by subject matter experts (SMEs). They use their knowledge to create simple sets of rules such as "if-then" statements to manage their NMS, rather than requiring skilled programmers to integrate devices and other elements with additional computer software code such as C and/or C++. However, even with NetExpert's high level language, rule set development is labor and time intensive, as well as subject to human error and expense.

NMSs can manage a wide range of communications and computer devices, from switches and routers, testing devices, video units, banking ATM machines, air traffic control systems and any other computerized device, database and object. OSSs provide a broader layer of functionality to directly support the daily operation of the network, such as order negotiation, order processing, line assignment, line testing and billing. NMSs can be a component of a larger OSS system. However, for the sake of simplicity, but not limitation, the communication switching network context will be used throughout this application.

Each device, for example a switch, has available certain information relating to its operation, such as performance, fault, provisioning and configuration. For each device, the correlation of performance information with operational functions is a labor intensive effort that is typically performed by a skilled programmer. If an equipment provider develops and markets a new switch, typically a skilled programmer has to identify and analyze all of the performance information for that switch. The programmer then correlates that information with all of the functionalities that a customer may desire to use in connection with that switch, and then modifies its existing NMS/OSS program code to manage that switch.

OSI's network management and operations support framework, NetExpert, currently uses a high level language to permit nonprogrammers to write instructions, referred to as rule sets, to manage or route information within NetExpert, between NetExpert systems, or between NetExpert and other programs and functions, without the cost and complexity of other NMSs/OSSs. For example, if a particular fault message is generated by the switch, one customer may want to page a particular technician, while a second customer may only want to have an indicator light activated. Even with NetExpert, these rules have to be entered through 4GL editors. Although SMEs have better knowledge of the business practices of the customer, and the rules can be more easily crafted with NetExpert, the time, cost and complexity of the NMS/OSS is still significant.

While this invention relates to any NMS/OSS, it will be described in reference to OSI's NetExpert system to provide a concrete example of a NMS application.

FIG. 1 depicts a schematic diagram of the prior NetExpert system 10. NetExpert is based on the Telecommunication Management Network (TMN) standards promulgated by the International Telecommunications Union. It supports the development and deployment of applications for the main TMN areas, i.e. fault, configuration, performance, accounting, and security. The NetExpert framework 10 has been designed to manage external systems that include network elements, network element management systems, legacy support systems, CMIP protocol controlled agents/managers, Simple Network Management Protocol ("SNMP") agents/managers, user applications, databases, and personnel. All of these elements 11 are objects that can be managed by the system, and the system can be used to provide functionality at each level of the TMN business model, element management, network management service management and business management levels.

Intelligent Gateway 12 provides the interface between the management system and the objects to be managed. Gateway 12 includes protocol agents, which take specific protocols (e.g. X .25, TCP/IP, RS232) and translate them into ASCII, to translate data for network elements 11 that filter the data into discrete events. The events, unique occurrences such as power failures, card failures and similar incidents of concern, may be processed at the gateway or passed on to the server for processing, or may be stored in a database. NetExpert administrator 16 interacts with gateway control 17 and management information base (MIB) 14 to control gateways in the system and manage command and response interactions.

Intelligent Gateway 12 contains Identification Rules which identify particular messages from the various devices and systems which are to be interfaced with the system. Intelligent Gateway 12 also contains Parse Rules which extract relevant information from the message stream, which may be stored or used in further analysis of the message. Intelligent Gateway 12 also contains Gateway Analysis rules which are basic if-then-else operators which allow the Gateway to analyze the data prior to forwarding the events and attributes on for further processing. Events and attributes contain significant information which is required in making decisions. The values of parsed attributes are taken from incoming raw data. Finally, Intelligent Gateway 12 also contains Dialogues which are commands that are sent back to the interfaced device and/or system. The Gateway itself reacts to outside messages or stimulation and can also be configured to poll devices for information.

Intelligent Gateways 12 are administered and controlled through Gateway Administration Editor 16. Administration Editor 16 specifies protocols, end of line (EOL) sequences, device specifics, etc. that are specific to each Gateway. Gateway Control window 17 is where Gateways to various outside elements can be started and stopped. Archive functions as well as other diagnostic tools can be controlled through Gateway Control 17 and Administration Editor 16.

IDEAS™ 13 (a trademark of Objective Systems Integrators) is the rule engine of the NetExpert system 10. It receives and processes events coming from Intelligent Gateway 12 and elements 11. It first identifies or discovers an object related to the event being processed by using attribute values parsed by Intelligent Gateway 12. IDEAS 13 then executes rule sets applicable to the event's behavior. This rule execution may thread through many related rules before completion. For example, the rule sets may specify that the event be delivered to operator work station 15, where the operator, by looking at a GUI can view the information in a desired format and may also specify that the data is to be stored in management information base (MIB) database 14. Thus, IDEAS 13 compares the incoming information from Intelligent Gateway 12 with the established rule set for determining the subsequent action to be taken.

NMSs and OSSs must provide to the user, system scalability, which is the ability to continually add more elements, as well as flexibility, which is the ability to add a wide range of elements, while maintaining simplicity, efficiency and low cost. While currently at least the NetExpert NMS/OSS offers the ability to tailor the management logic for any element without the use of programmers, a significant amount of human effort and cost is still required. The higher the level of the TMN business model, the more human effort and cost is likely to be incurred in delivering the functionally required by the end user.

SUMMARY OF THE INVENTION

These and other objects, features and technical advantages are achieved by a system and method in which the inventive system and method incorporates artificial intelligence concepts with the existing network management approach to create an NMS/OSS that automatically integrates new network elements. The inventive NMS/OSS detects the connection of the new element. The NMS/OSS identifies the new element, either precisely or inferentially, by examining the protocol, inputs, and outputs of the new element as compared with stored information. The NMS/OSS then either selects the appropriate rule set from previously written rules, modifies an existing rule set, or creates an appropriate rule set to integrate each new element into the network. This yields a NMS/OSS that has less risk of human error, requires less time to place into operation, and costs less.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
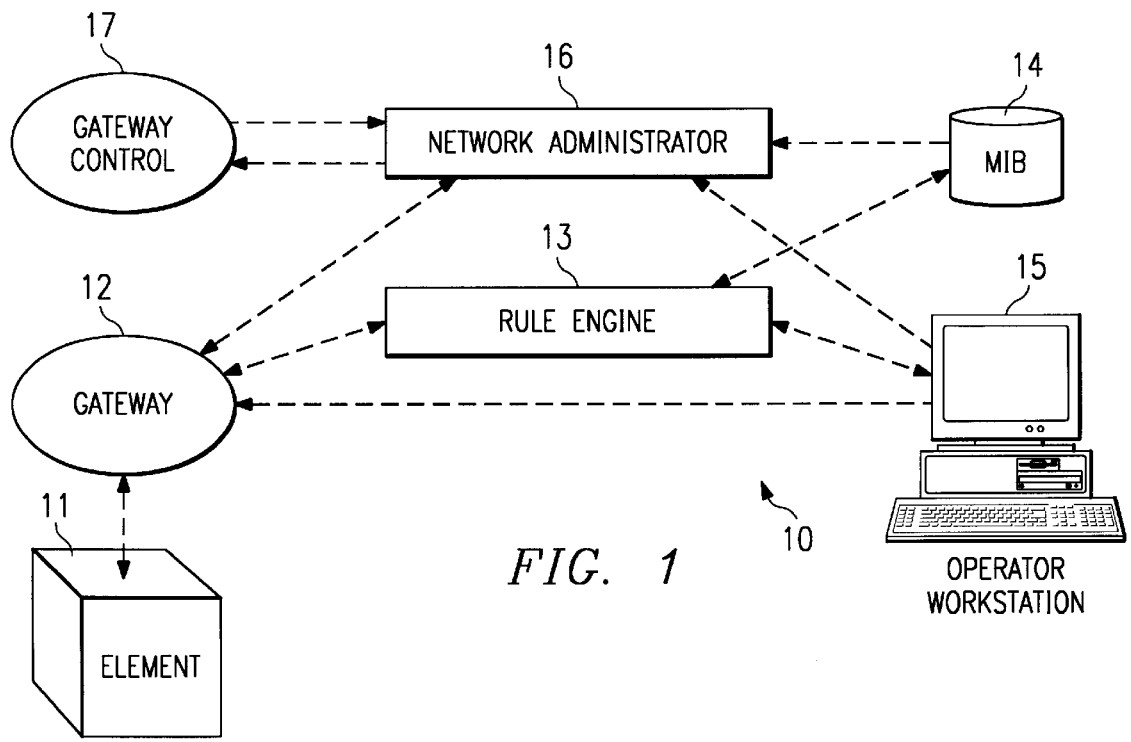
FIG. 1 depicts the prior art network management system.
Figure 2:
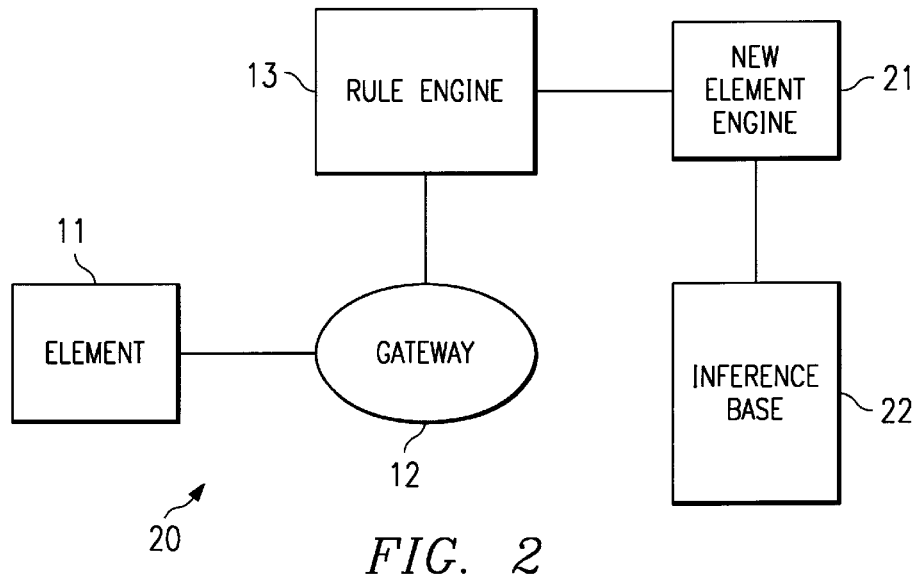
FIG. 2 depicts the inventive network management system.

FIG. 2 depicts NMS/OSS 20 that uses artificial intelligence, more specifically, it uses expert systems and learning techniques to automatically identify and integrate new networks elements. Components of FIG. 2 that are similar to those in FIG. 1 have been labeled accordingly.

System 20 includes new element engine 21 and inference base 22. New element engine 21 identifies a newly attached network element 11 by sending out a series of interrogatories and examining the responses with reference to inference base 22. The interrogatories include protocol questions and analytical input/output questions. If new element engine cannot precisely determine the identity of element 11, it will deduce the identity using inference base 22. New element engine 21 either selects existing rules from the inference base or writes new rules by using inference base 22 and by asking a series of higher level questions to a system user. The inventive system would also modify an existing rule set for an existing, known element. For example, an element is being used in such a manner so as to exceed the boundaries of the existing rule set. IDEAS 13 would then alert the new element engine 21 that it requires a rule update to proceed. Engine 21 would then modify the rule set to capture that use. The system could either notify the operator before or after modification to either seek permission or report the modification.

New element engine 21 and inference base 22 function in the system as follows. A new network element 11 is connected to the system. Element 11 starts communicating information through gateway 12 to IDEAS 13. IDEAS 13 receives the information and determines that it is from an unidentified source, and consequently, IDEAS 13 lacks a rule set for managing new element 11. IDEAS 13 will then pass the information to new element engine 21.

New element engine 21 determines the identity of new element 11 by performing a series of tests on new element 11. The engine will first determine the protocol that new element 11 is using, and this will permit further communication with the new element. Since there are a limited number of industry accepted protocols, the engine will run test patterns for each different protocol on new element 11. Each protocol used today is significantly different from other protocols, for example, Serial, X.25, TCP/IP, SNMP, CMIP, CORBA, etc. Each protocol requires its own protocol agent to interpret and communicate properly. Thus, the system systematically tests each for each protocol by polling the device environment in determining the specifics of the protocol agent that is used by the device. If the protocol cannot be identified, new element engine will send an alarm indicating its failure in identifying the protocol. Rules in the new element engine will direct the alarm as desired by the operator, and will allow the operator to provide the proper protocol identification to the engine.

Next, the new element engine will send out analytical questions and examine the responses by new element 11. Once the protocol has been determined, the device is polled with basic commands to further narrow down the specifics of the device. For example if the protocol is TCP/IP, does it speak Transaction Language 1 (TL1), or Man Machine Language (a predecessor to TL1). Another Example is SNMP; once a Trap PDU is received and the device has been identified by IP addresses, an automatic GET should identify the system (i.e.: router, server, hub, etc.). The new element engine will consider the responses with reference to inference base 22, and attempt to match the responses stored within the inference base. The new element engine also considers which questions have been responded to by the new element, as well as the questions that did not yield a response.

The inference base contains several independent libraries, including types of elements potentially used by the customer of this particular system, along with their respective associated protocols and analytical responses. Other libraries would include available data on different known elements, existing available rule sets, and relevant information for the MIB14. For more standardized protocols such as SNMP, CMIP, and CORBA, the inference base 22 would keep track of Abstract Syntax Notation (ASN.1) MIBs, Guideline Definitions for Managed Objects (GDMOs), and Interface Definition Languages (IDLs), for each specific device and version of the devices.

From the protocol and analytical responses, new element engine 21 should be able to determine the identify of the new element by polling the device with specific questions which are encapsulated into automated intelligent dialogs. As responses come back from the device such as device model, type, version configuration, etc., the new element engine 21 will use these attributes to identify an applicable set of rules to use. If it cannot precisely identify new element 11, the engine may infer its identity by determining which known element the new element most closely resembles. The engine would attempt to place the new element in a particular class of elements by searching the inference base 22 for common response patterns. For example, a new Synchronous Optical Network (SONET) Add Drop Multiplexer (ADM) may be identified on a SONET fiber optic ring. This new device may not be one the inference engine would recognize, but due to its standard protocol and its standard communication language (i.e.: TL1), the system would be able to infer which rule set to use. For example, a Generic TL1 rule set would be applied in this case. Most elements will be readily recognizable, because they are very commonly used in such systems.

After new element 11 has been identified, either directly or inferentially, then new element engine 21 produces a rule set that allows IDEAS 13 to manage element 11. If the element has been directly identified, then the engine would retrieve the associated rule set from inference base 22. The rule set would include any Managed Information Base (MIB) definitions, ID/Parse/Analysis rules, and graphics. If the element has been identified by inference, the engine would retrieve either the rule set for the closest element, a generic rule set for the class of elements, or create a rule set. If the closest element rule set or the generic rule set are insufficient to allow management of device 11, then engine 21 would create a rule set.

Engine 21 would interface with the subject matter expert on a higher level, and by posing a series of questions or prompts to the SME, the engine would draft the rule set, tailored to the business needs of the SME, addressing the higher levels of the TMN business model. The prompts would investigate the desirability of using all or part of existing rule sets for already connected elements that are analogous to the new element. The prompts would also query the user as to the types of functions the element would be expected to perform, as well as, formats for inputs and outputs from the element. From the results of this session with the SME, engine 21 could retrieve rules for the associated functions, input and output formats, as well as rules for existing elements from the inference base and combine them to form a rule set that allows the IDEAS 13 to manage element 11. The IDEAS 13 could then adapt and add new events to the rule set as new messages are received.

Accordingly, the inventive system identifies the new element and produces rule sets to manage the element and provide the applicable operations support, and thus, does not rely upon a programmer or SME to draft the rule sets by hand. This inventive approach is not labor intensive, nor is it subject to human error. Moreover, the time required by the invention to draft the rule set is a fraction of the time required when drafted by hand.

Although the present invention and its advantages have been described in detail, it should be understood that various changes, substitutions and alterations can be made herein without departing from the spirit and scope of the invention as defined by the appended claims.

What is claimed is:

1. A network management support system that automatically integrates a new element into the system, the system comprising:

means for identifying the new element by comparing certain characteristics of the new element with characteristic information stored in a database; and means for formulating a rule set for managing the new element based upon an identification of the new element and control information stored in the database.

2. The network management system of claim 1, wherein:

the network management system is a component of an operations support system.

3. The network management support system of claim 1, wherein the means for identifying comprises:

means for determining a protocol used by the new element;

means for analyzing input accepted by the new element; and means for analyzing output issued by the new element.

4. The network management support system of claim 3, wherein the means for determining the protocol comprises:

means for applying a plurality of test patterns to the new element;

wherein each test pattern corresponds to a different standard protocol.

5. The network management support system of claim 3, wherein the means for analyzing input comprises:
   means for applying a plurality of analytical test questions to the new element; and
   means for determining to which questions the new element responded.

6. The network management support system of claim 3, wherein the means for analyzing output comprises:
   means for applying a plurality of analytical test questions to the new element; and
   means for comparing responses to the questions and the protocol used by the new element with information stored in the database.

7. The network management support system of claim 6, wherein:
   the means for comparing matches the responses and the protocol with information in the database, and directly identifies the new element.

8. The network management support system of claim 6, wherein:
   the means for comparing does not match the responses and the protocol with information in the database.

9. The network management support system of claim 8, wherein the means for identifying further comprises:
   means for inferentially identifying the new element by determining a particular class of elements to which the new element is associated.

10. The network management support system of claim 8, wherein the means for identifying further comprises:
    means for inferentially identifying the new element by determining a known element which resembles the new element.

11. The network management support system of claim 3, wherein the means for identifying comprises:
    means for comparing the protocol, the input, and the output of the new element with other information stored in a database.

12. The network management support system of claim 1, wherein the means for identifying comprises:
    means for comparing a protocol, an input, and an output of the new element with information stored in a database.

13. The network management support system of claim 1, further comprising:
    means for detecting a connection of the new element with the system.

14. The network management support system of claim 1, further comprising:
    means for using the rule set to manage the new element.

15. The network management support system of claim 1, wherein the means for formulating comprises:
    means for determining functional requirements of the new element.

16. The network management support system of claim 1, wherein the new element has been directly identified, and the means for formulating comprises:
    means for retrieving the rule set, from the database, which corresponds to the directly identified new element.

17. The network management support system of claim 1, wherein the new element has been inferentially identified, and the means for formulating comprises:
    means for retrieving the rule set, from the database, which corresponds to a known element that resembles the new element.

18. The network management support system of claim 1, wherein the new element has been inferentially identified, and the means for formulating comprises:
    means for retrieving the rule set, from the database, which is useable for a class of elements in which the new element has been associated.

19. The network management support system of claim 1, wherein the new element has been inferentially identified, and the means for formulating comprises:
    means for creating the rule set by posing a predetermining series of interrogatories to a system user.

20. A network management support system that automatically integrates a new element into the system, the system comprising:
    means for detecting a connection of the new element with the system;
    means for determining a protocol used by the new element;
    means for analyzing input accepted by the new element;
    means for analyzing output issued by the new element;
    means for identifying the new element by comparing the protocol, the input, and the output of the new element with information stored in a database;
    means for formulating a rule set for managing the new element based upon an identification of the new element and information stored in the database; and
    means for using the rule set to manage the new element.

21. The network management system of claim 20, wherein:
    the network management system is a component of an operations support system.

22. The network management support system of claim 20, wherein the means for determining the protocol comprises:
    means for applying a plurality of test patterns to the new element;
    wherein each test pattern corresponds to a different standard protocol.

23. The network management support system of claim 20, wherein the means for analyzing output comprises:
    means for applying a plurality of analytical test questions to the new element; and
    means for comparing responses to the questions and the protocol used by the new element with information stored in the database.

24. The network management support system of claim 23, wherein:
    the means for comparing matches the responses and the protocol with information in the database, and directly identifies the new element.

25. The network management support system of claim 24, wherein the means for formulating comprises:
    means for retrieving the rule set, from the database, which corresponds to the directly identified new element.

26. The network management support system of claim 23, wherein:
    the means for comparing does not match the responses and the protocol with information in the database.

27. The network management support system of claim 26, wherein the means for identifying further comprises:
    means for inferentially identifying the new element by determining a particular class of elements to which the new element is associated.

28. The network management support system of claim 27, wherein the means for formulating comprises:

means for retrieving the rule set, from the database, which is useable for the class of elements.

29. The network management support system of claim 26, wherein the means for identifying further comprises:

means for inferentially identifying the new element by determining a known element which resembles the new element.

30. The network management support system of claim 29, wherein the means for formulating comprises:

means for retrieving the rule set, from the database, which corresponds to the known element.

31. The network management support system of claim 26, wherein the means for formulating comprises:

means for creating the rule set by posing a predetermining series of interrogatories to a system user.

32. A method for automatically integrating a new element into a network management support system, the method comprising the steps of:

identifying the new element by comparing certain characteristics of the new element with characteristic information stored in a database; and formulating a rule set for managing the new element based upon an identification of the new element and control information stored in the database.

33. The method of claim 32, wherein:

the network management system is a component of an operations support system.

34. The method of claim 32, wherein the step for identifying comprises the steps of:

determining a protocol used by the new element;

analyzing input accepted by the new element; and analyzing output issued by the new element.

35. The method of claim 34, wherein the step of determining the protocol comprises the step of:

applying a plurality of test patterns to the new element;

wherein each test pattern corresponds to a different standard protocol.

36. The method of claim 34, wherein the step of analyzing output comprises the steps of:

applying a plurality of analytical test questions to the new element; and comparing responses to the questions and the protocol used by the new element with information stored in the database.

37. The method of claim 36, wherein:

the step of comparing matches the responses and the protocol with information in the database, and directly identifies the new element.

38. The method of claim 36, wherein:

the step of comparing does not match the responses and the protocol with information in the database.

39. The method of claim 38, wherein the step of identifying further comprises the step of:

inferentially identifying the new element by determining a particular class of elements to which the new element is associated.

40. The method of claim 38, wherein the step of identifying further comprises the step of:

inferentially identifying the new element by determining a known element which resembles the new element.

41. The method of claim 34, wherein the step of identifying comprises the step of:

comparing the protocol, the input, and the output of the new element with other information stored in a database.

42. The method of claim 32, further comprising the step of:

detecting a connection of the new element with the system.

43. The method of claim 32, further comprising the step of:

using the rule set to manage the new element.

44. The method of claim 32, wherein the step of formulating comprises the step of:

determining functional requirements of the new element.

45. The method of claim 32, wherein the new element has been directly identified, and the step of formulating comprises the step of:

retrieving the rule set, from the database, which corresponds to the directly identified new element.

46. The method of claim 32, wherein the new element has been inferentially identified, and the step of formulating comprises the step of:

retrieving the rule set, from the database, which corresponds to a known element that resembles the new element.

47. The method of claim 32, wherein the new element has been inferentially identified, and the step of formulating comprises the step of:

retrieving the rule set, from the database, which is useable for a class of elements in which the new element has been associated.

48. The method of claim 32, wherein the new element has been inferentially identified, and the step of formulating comprises the step of:

creating the rule set by posing a predetermining series of interrogatories to a system user.

49. A method that automatically integrates a new element into a network management support system, the method comprising the steps of:

detecting a connection of the new element with the system;

determining a protocol used by the new element;

analyzing input accepted by the new element;

analyzing output issued by the new element;

identifying the new element by comparing the protocol, the input, and the output of the new element with information stored in a database;

formulating a rule set for managing the new element based upon an identification of the new element and information stored in the database; and using the rule set to manage the new element.

50. The method of claim 49, wherein:

the network management system is a component of an operations support system.

51. The method of claim 49, wherein the step of determining the protocol comprises the step of:

applying a plurality of test patter ns to the new element;

wherein each test pattern corresponds to a different standard protocol.

52. The method of claim 49, wherein the step of analyzing output comprises the steps of:

applying a plurality of analytical test questions to the new element; and comparing responses to the questions and the protocol used by the new element with information stored in the database.

53. The method of claim 52, wherein:

the step of comparing matches the responses and the protocol with information in the database, and directly identifies the new element.

54. The method of claim 53, wherein the step of formulating comprises the step of:

retrieving the rule set, from the database, which corresponds to the directly identified new element.

55. The method of claim 52, wherein:

the step of comparing does not match the responses and the protocol with information in the database.

56. The method of claim 55, wherein the step of identifying further comprises the step of:

inferentially identifying the new element by determining a particular class of elements to which the new element is associated.

57. The method of claim 56, wherein the step of formulating comprises the step of:

retrieving the rule set, from the database, which is useable for the class of elements.

58. The method of claim 55, wherein the step of identifying further comprises the step of:

inferentially identifying the new element by determining a known element which resembles the new element.

59. The method of claim 58, wherein the step of formulating comprises the step of:

retrieving the rule set, from the database, which corresponds to the known element.

60. The method of claim 55, wherein the step of formulating comprises the step of:

creating the rule set by posing a predetermining series of interrogatories to a system user.

* * * * *